United States Patent [19]
Taylor et al.

[11] Patent Number: 6,072,907
[45] Date of Patent: Jun. 6, 2000

[54] METHOD AND APPARATUS FOR ENHANCING AND THRESHOLDING IMAGES

[75] Inventors: Michael J. Taylor, Guildford; Anthony Zappala, London, both of United Kingdom

[73] Assignee: Xerox Corporation, Stamford, Conn.

[21] Appl. No.: 09/081,269

[22] Filed: May 19, 1998

[30]     Foreign Application Priority Data

May 28, 1997 [GB] United Kingdom ............ 9711024

[51] Int. Cl.[7] .............. G06K 9/36; G06K 9/32; G06K 9/40
[52] U.S. Cl. ............ 382/237; 382/263; 382/272; 382/274; 382/300; 358/428; 358/465
[58] Field of Search .................. 382/237, 260, 382/263, 270, 272, 274, 275, 279, 299–300; 358/428, 429, 455, 461, 465, 466, 525

[56]     References Cited

U.S. PATENT DOCUMENTS

| | | | |
|---|---|---|---|
| 4,628,356 | 12/1986 | Spillman et al. | 358/111 |
| 4,912,569 | 3/1990 | Petilli | 358/465 |
| 5,389,887 | 2/1995 | Mizukoshi | 327/72 |
| 5,444,552 | 8/1995 | Smith, III | 358/465 |
| 5,511,148 | 4/1996 | Wellner | 395/106 |
| 5,546,194 | 8/1996 | Ross | 358/445 |
| 5,546,474 | 8/1996 | Zuniga | 382/176 |

FOREIGN PATENT DOCUMENTS

| | | |
|---|---|---|
| 0 083 213 A2 | 7/1983 | European Pat. Off. . |
| 0 495 622 A2 | 7/1992 | European Pat. Off. . |
| 0 651 557 A1 | 5/1995 | European Pat. Off. . |

OTHER PUBLICATIONS

European Search Report EP 0 881 596 A3 for EPO counterpart Application No. 98304195.5 published Jan. 13, 1999.
Mitchell, Joan L, William B. Pennebaker, Dimitris Anastassiou, and Keith S. Pennington, "Graphics Image Coding for Freeze–Frame Videoconferencing", IEEE Transactions on Communications, vol. 37, No. 5., pp. 515–522, May 1989.

*Primary Examiner*—Bhavesh Mehta

[57]           ABSTRACT

An image processing method and system for generating enhanced binary image data from greyscale input image data. The method includes the steps of (a) receiving first image data, the first image data being greyscale image data defining an input image, (b) performing a high frequency boost operation on the first image data to produce second image data, (c) performing a linear interpolation operation on the second image data to produce third image data, the third image data having a resolution higher than the resolution of the second image data, (d) performing a contrast enhancement operation on the third image data to produce fourth image data, and (e) thresholding the fourth image data to produce fifth image data, the fifth image data being binary image data defining an output image. The techniques find application, for example, in over-the-desk scanning of documents, and in video-conferencing.

18 Claims, 15 Drawing Sheets

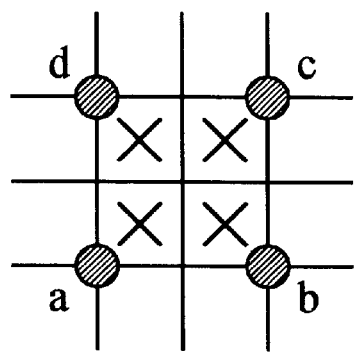
FIG. 3A
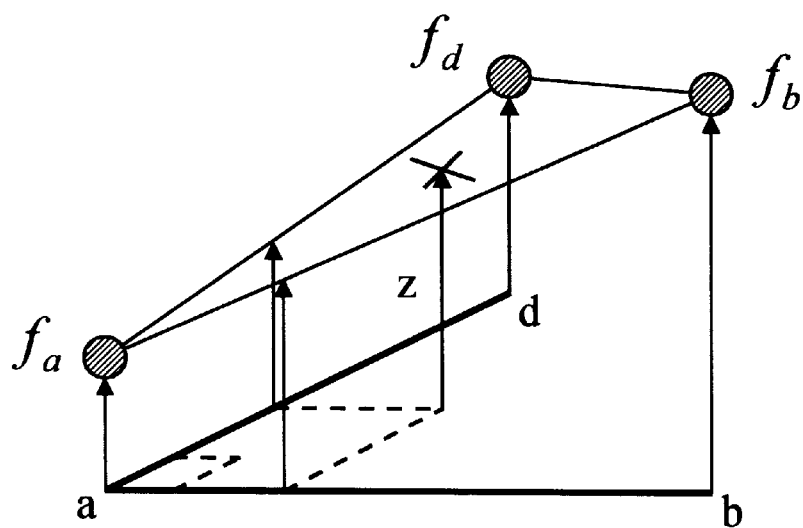
FIG. 3B
$$z = \frac{1}{4}(2f_a + f_b + f_d)$$
FIG. 3C

FIG. 5A
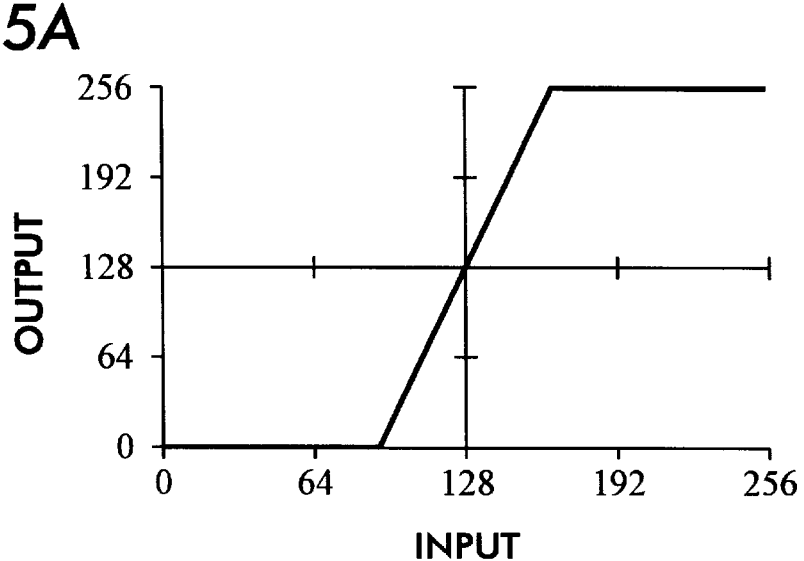
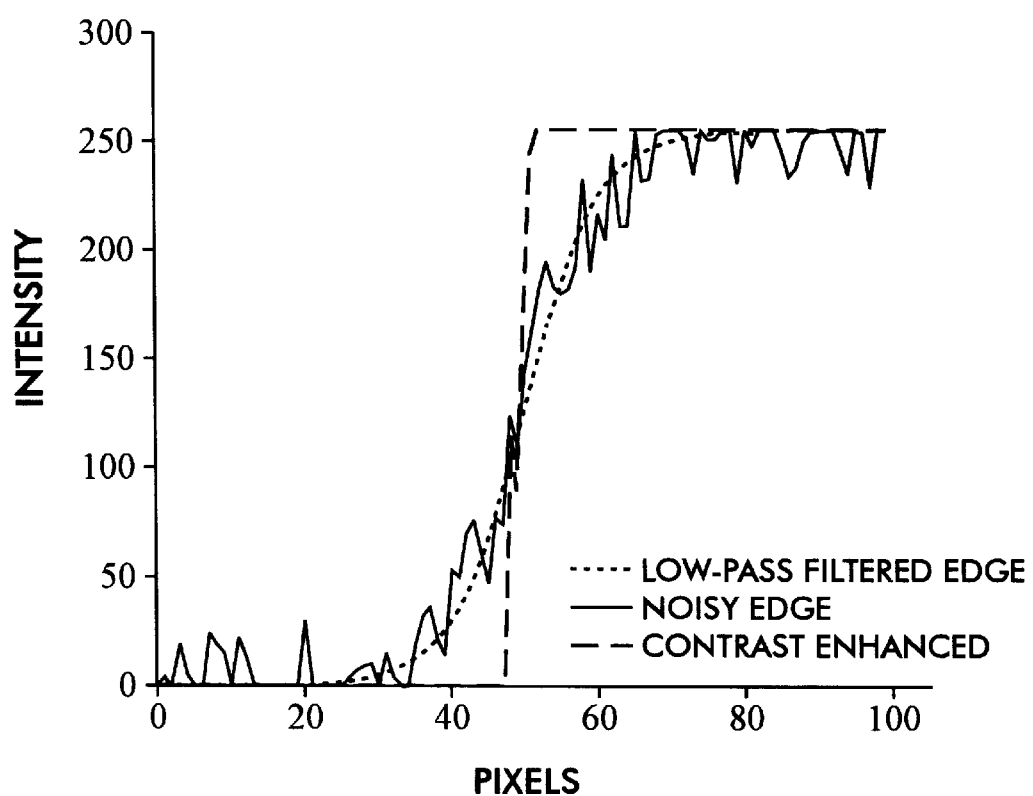
FIG. 5B dividing a
ionally uni
document
componer
from the
hat were

FIG. 9D ntation is
nctly differ
is desired.
may need s
graphics a
ration of c

FIG. 9E ntation is
nctly differ
is desired.
may need s
graphics a
ration of c

FIG. 9F

Since there are many evaluation aspects for extraction techniques and there are conflicting requirements for these aspects, it is difficult to find a technique which is superior in every aspect. The lack of quantitative measures for some aspects such as subjective evaluation of output images and parameter setting makes the evaluation more difficult. Therefore the best evaluation is testing in practical applications.

FIG. 11A

Since there are many evaluation aspects for extraction techniques and there are conflicting requirements for these aspects, it is difficult to find a technique which is superior in every aspect. The lack of quantitative measures for some aspects such as subjective evaluation of output images and parameter setting makes the evaluation more difficult. Therefore the best evaluation is testing in practical applications.

FIG. 11B

Since there are many evaluation aspects for extraction techniques and there are conflicting requirements for these aspects, ills difficult to find a technique which is superior in every aspect. The lack of quantitative measures for some aspects such as subjective evaluation of output images and parameter setting makes the evaluation more difficult. Therefore the best evaluation is testing in practical applications.

*FIG. 12*

METHOD AND APPARATUS FOR ENHANCING AND THRESHOLDING IMAGES

BACKGROUND OF THE INVENTION

1. Field of the Invention

The present invention relates to image processing, and more particularly to techniques providing image enhancement and thresholding of images.

2. Description of Related Art

There are numerous situations in which it would be desirable to be able to enhance the quality of images (for example, from cameras found in video-conferencing systems) which are stored, communicated and/or processed in (digital) electronic form. Also, such enhancement is desirable in order to produce efficient and high quality video scanning of document images in over-the-desk scanning systems such as those disclosed in EP-A-622,722 and British patent application 9614694.9: these patent applications describe systems employing a video camera disposed above a desk and capturing images of documents which are displayed to a user.

Over-the-desk scanning with video cameras has many advantages over traditional scanning techniques, as discussed in some detail in the aforementioned patent applications.

A problem that that arises in the aforementioned systems is that of how to convert the images from the document camera to a form as close to the original paper image as possible. An obvious disadvantage with the scanners used in those systems is the poor resolution of existing TV cameras, which will only provide 100 dpi (dots/inch) (4 dots/mm) greyscale over a desk-top footprint of 4"×3" (100 mm×75 mm) (or about a quarter of a page).

Numerous thresholding algorithms of varying degrees of complexity are known. Mitchel, J. et. al. "Graphics Image Coding for Freeze-Frame Videoconferencing," *IEEE Trans. on Comms.*, Vol. 37, No. 5, May 1989 consider the problem of document image coding for freeze-frame video conferencing. They map an 8 bits per pixel (bpp) image to 3 bpp which achieves their goal of increased coding efficiency. They do not generate a higher resolution binary image.

There is a need for image processing methods and systems able to generate high-resolution binary images so that traditional document image decoding algorithms involving morphological operations and connected component analysis may be used. In short, there is a need for computationally efficient conversion of low resolution greyscale images to higher resolution binary images, for example of documents in the desk-top environment.

SUMMARY OF THE INVENTION

In accordance with the invention, there is provided a method, and image processing system therefor, for converting a low resolution greyscale image to a high resolution binary image. The method includes the steps of: (a) receiving first image data, the first image data being greyscale image data defining an input image, (b) performing a high frequency boost operation on the first image data to produce second image data, (c) performing a linear interpolation operation on the second image data to produce third image data, the third image data having a resolution higher than the resolution of the second image data, (d) performing a contrast enhancement operation on the third image data to produce fourth image data, and (e) thresholding the fourth image data to produce fifth image data, the fifth image data being binary image data defining an output image.

In accordance with one aspect of the invention, there is provided techniques whereby resolution can be improved significantly, such as to 200 dpi (8 dots/mm). This resolution is equivalent to low-quality fax, which is sufficient for reasonable OCR and interactive text selection. In this way, for instance, it is possible to pass images directly to OCR tools such as TextBridge® (which is available from Xerox ScanSoft Inc.). The advent of HDTV standards will cause the price of large CCD cameras to fall dramatically, and these same techniques will yield better/larger images.

In accordance with another aspect of the invention, the method is based on the assumption that an original document image is bimodal in color space (typically black and white) and that the lighting conditions for recording the original image are within a specified tolerance. With these assumptions, the method of the present invention provides simultaneous resolution enhancement and thresholding of document images. Furthermore, the method of the present invention uses a very efficient local averaging technique to maintain a local estimate of a background/foreground threshold. It is believed that adaptive thresholding is more important for capturing high spatial frequencies than for accommodating large lighting variations across the desk in over-the-desk scanning systems. However, when ambient lighting conditions are extremely poor, the method degrades in a graceful manner.

BRIEF DESCRIPTION OF THE DRAWINGS

These and other aspects of the invention will become apparent from the following description read in conjunction with the accompanying drawings wherein the same reference numerals have been applied to like parts and in which:

FIGS. 3A–3C illustrate a simple scheme for implementing the linear interpolation step in FIG. 1;

FIG. 5A shows a contrast enhancement function, and FIG. 5B shows the effect thereof, as employed in the process of FIG. 4;

FIGS. 9A–9F show images as presented in FIGS. 6A–6F but using adaptive contrast enhancement as shown in FIG. 4;

FIGS. 11A–11B show typical results of the techniques according to the invention under normal lighting conditions;

FIG. 12 shows the results of OCR on the output image of FIGS. 11A–11B; and

DETAILED DESCRIPTION

A. System Configuration

It will be appreciated that the techniques according to the invention may be employed in any system or application where the production of enhanced binary image data from multiple bit-per-pixel image data is required. Such instances include videoconferencing systems, scanning systems, multifunction devices, and the like. It will be appreciated that the invention may be implemented using a PC running Windows® by Microsoft Corp., a Mac running Mac® OS by Apple Corp., or a minicomputer running UNIX, which are well known in the art. For example, the PC hardware configuration is discussed in detail in *The Art of Electronics*, 2nd Edn, Ch. 10, P. Horowitz and W. Hill, Cambridge University Press, 1989. In the case of over-the-desk scanning, the invention may form part of the systems described in any of EP-A-495,622, EP-A-622,722, or British patent application 9614694.9. The invention has been implemented in C++ on an IBM-compatible PC running Windows NT®.

B. Overview: Image Enhancement And Thresholding

Figure 1:
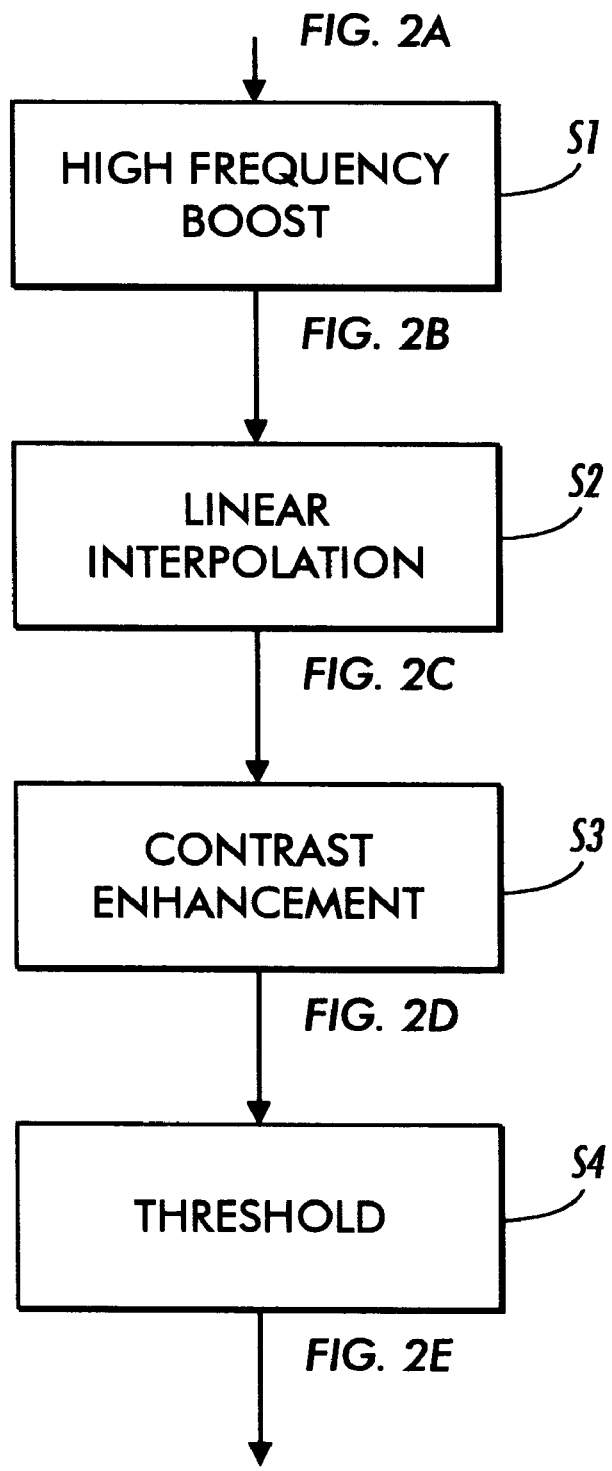
FIG. 1 is a flow chart illustrating the steps in performing image enhancement and thresholding in accordance with an embodiment of the present invention.

FIG. 1 is a flow chart illustrating the steps in performing image enhancement and thresholding in accordance with an embodiment of the present invention. The method used to convert low resolution greyscale to higher resolution binary images can be best described as a four stage process: performing a high frequency boost (step S1), increasing spatial resolution via linear interpolation (step S2), performing contrast enhancement (step S3), and thresholding (step S4).

B.1 High Frequency Boost (Deconvolution)

Step S1 in FIG. 1 involves applying to the original image (greyscale) data a high frequency boost (or deconvolution operation). This is a well know document image processing technique (Gonzalez, R. C., Woods, R. E. "Digital Image Processing," Addison-Wesley 1992, pp 196, FIG. 1), which may be represented by High boost=$(A)$(Original)−Lowpass =$(A-1)$(Original)+Original−Lowpass =$(A-1)$(Original)+Highpass.

Figure 2A:
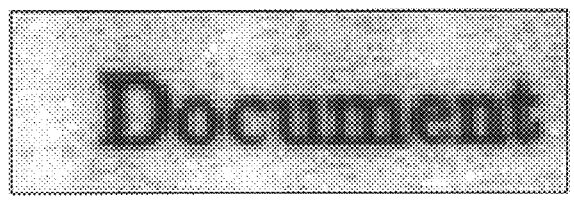
FIGS. 2A–2E show an exemplary original image and the state of the image at various stages in the chart of FIG. 1.
Figure 2B:
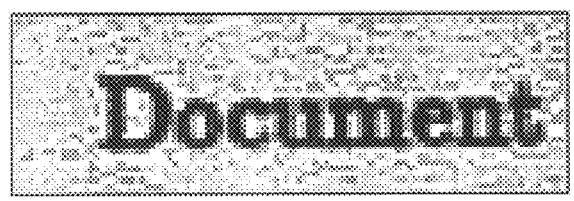

Here the technique exploits the fact that the original image is bimodal and that it has been degraded by the camera/framestore image channel via a point spread function (psf). A standard technique has been used to estimate the psf. Instead, the strength of the high frequency boost (deconvolution) has been adjusted empirically. It turns out that the implicit noise enhancing nature of this stage of the processing is not as critical as one might imagine because of the non-linear contrast enhancing step described in stage 3. FIG. 2A an example of an original image; and a typical result of this high frequency boost (deconvolution) step is shown in FIG. 2B.

B.2 Spatial Resolution via Linear Interpolation

Figure 2C:
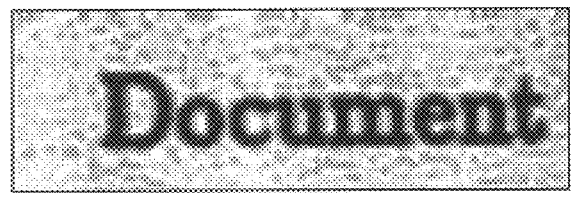

After high frequency boost (deconvolution), the image then undergoes a linear interpolation operation (step S2 in FIG. 1). This known technique may be used for increasing resolution, e.g. by doubling or trebling the number of pixels per linear dimension. A simple linear scheme for doubling or trebling spatial resolution is used, shown in FIGS. 3A–3C. Linear interpolation techniques are discussed further in J ähne B., *Digital Image Processing*, Section 8.2.4, Springer-Verlag (1990). The result after this linear interpolation step is shown in FIG. 2C.

B.3 Contrast Enhancement

Figure 2D:
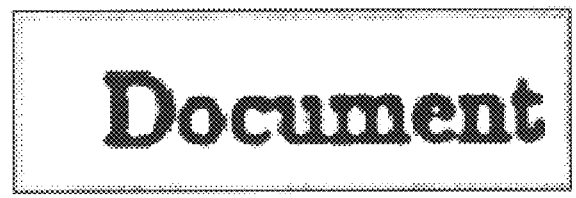

After linear interpolation at step S2 (FIG. 1), the image undergoes contrast enhancement. The result of the contrast enhancement is shown in FIG. 2D. The contrast enhancement stage is discussed in more detail in section C below.

Figure 2E:
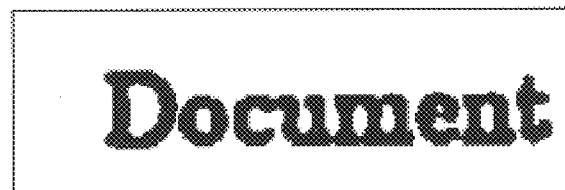

B.4 Thresholding p After contrast enhancement at step S3 (FIG. 1), the image then undergoes thresholding (step S4), and the result is illustrated in FIG. 2E. This step is well known in the art, and is suitably performed with a threshold at 128 (for an 8 bit/pixel image). This step relies on the fact that the contrast enhancement has done its job. Depending on the destination of the image, it is not necessarily a good thing to do. For example, if the image is to be printed, then leaving the greyscale around the characters can make the text look better. If OCR or faxing is required, thresholding is usually desirable.

C. Techniques for Contrast Enhancement

Figure 4:
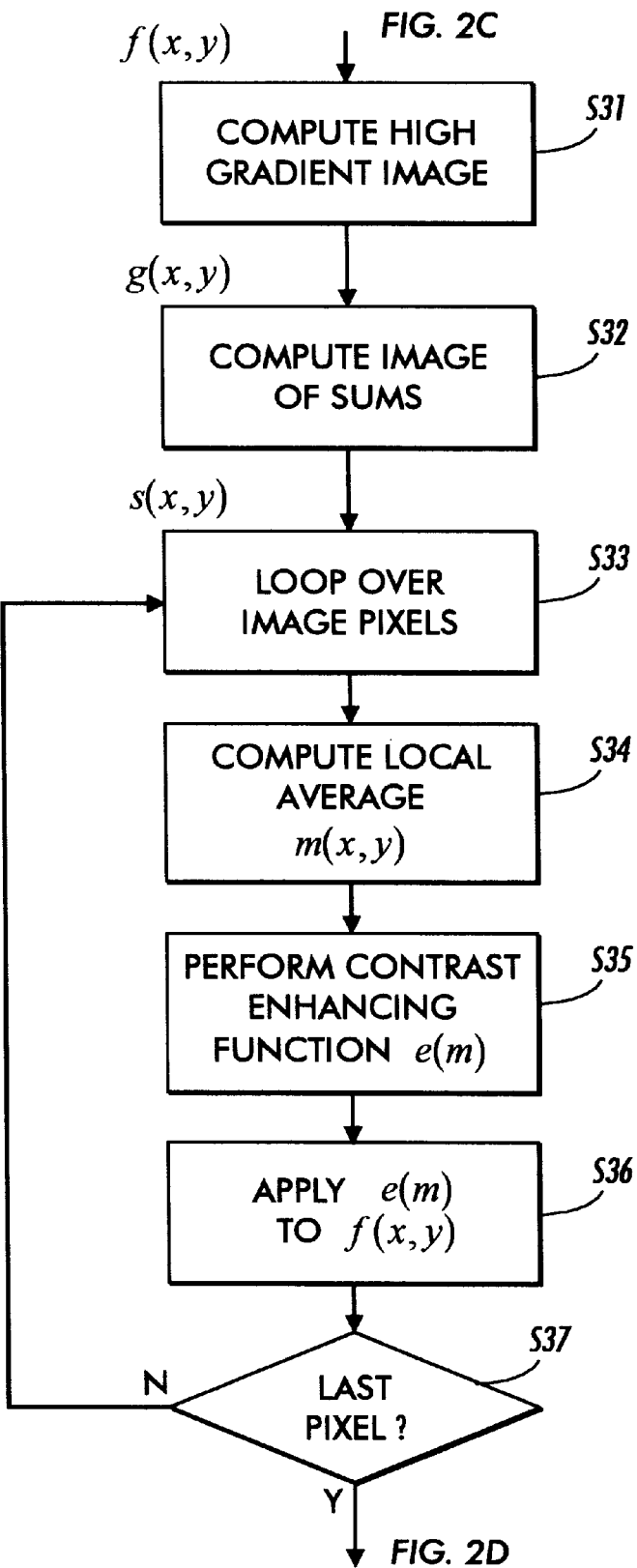
FIG. 4 shows the sub-steps employed in implementing the contrast enhancement step in FIG. 1.

FIG. 4 shows the sub-steps employed in implementing the contrast enhancement step in FIG. 1. The image at this stage is somewhat noisy as a result of the high-frequency boost. This stage removes much of this noise and the result is an image that is very nearly binary.

Figure 6A:
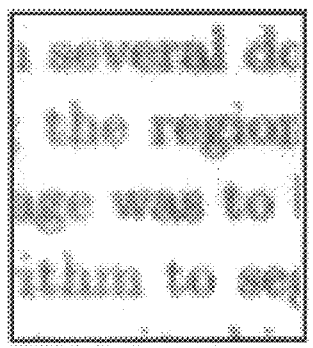
FIGS. 6A–6F illustrate the effect of varying lighting conditions on the effect of the contrast enhancement sub-steps in FIG. 4.
Figure 6B:
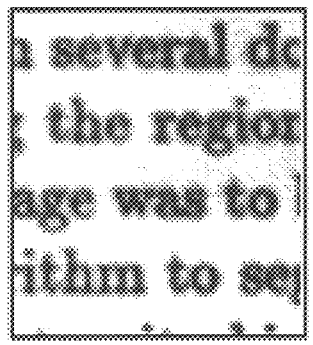
Figure 6C:
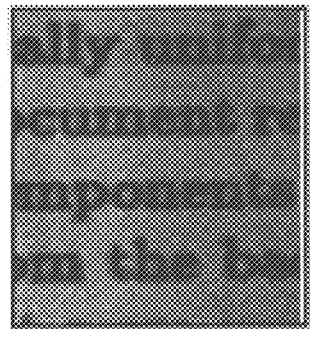
Figure 6D:
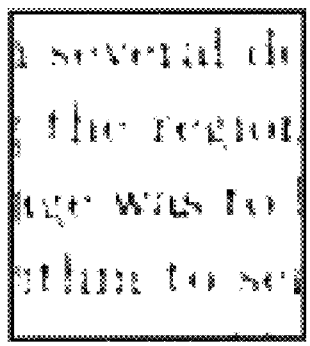
Figure 6E:
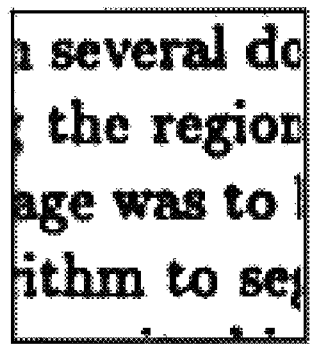
Figure 6F:
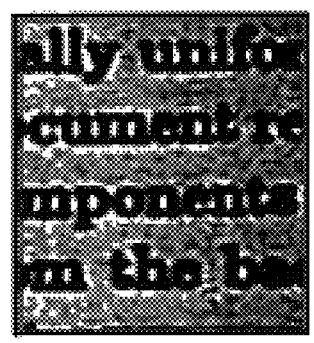

We define a clipping function e(m) where "m" is the central value about which the grey level intensities are pushed towards black or white. FIG. 5A shows this non-linear contrast enhancement function for m=128: the input grey levels are expanded about 128. FIG. 5B shows the effect this clipping function has on a noisy smoothed edge feature in one dimension. FIGS. 6A–6F illustrate the effect of varying lighting conditions on the effect of the contrast enhancement sub-steps in FIG. 4: FIGS. 6A–6C show original images, and FIGS. 6D–6F show the respective contrast enhanced images. If the contrast enhancing operator e(128) were to be applied to the image, good results would be obtained when the local threshold is close to 128 (see FIGS. 6B and 6E). However, when lighting conditions on the desk are bad and there are specularities (FIG. 6A) or shadows (FIG. 6C), this simple process yields poor results. For the case of a specularity (FIG. 6A) the simplistic contrast enhancing operator pushes most of the pixels towards white (FIG. 6D) because most of the text edges are centred about a greyscale that is significantly greater than 128. Similarly, for the case of the shadow, most edges are centred about a greyscale that is significantly less than 128 and so much of the image will be pushed towards black (FIG. 6F). It is clear that there is a need to enhance the contrast about a local greyscale value to achieve better results.

Figures 7A, 7B, 8A:
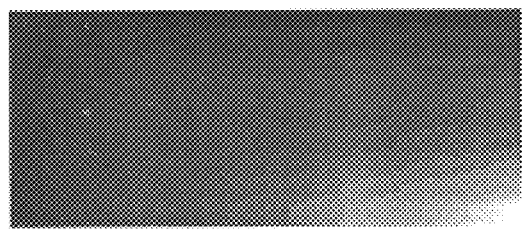
FIGS. 7A–7B show the effect of the sub-step in FIG. 4 of computing a high gradient image.
FIGS. 8A–8C illustrate the method of partial sums technique as used in a sub-step of FIG. 4.

Referring to FIG. 4, it can be seen the contrast enhancement process commences with the step S31 of computing a high gradient image. This is done by the technique of passing a Sobel operator over the input image data (here denoted f(x,y), i.e. the output of the preceding linear interpolation step). Sobel operators are discussed, for example, in Jähne B., *Digital Image Processing*, Section 6.3.2, Springer-Verlag (1990). Where there is a large response, the current pixel is returned; and when the response falls below an insensitive threshold, black (or zero) is returned. FIGS. 7A–7B show the effect of the step S31 in FIG. 4 of computing a high gradient image. In FIG. 7A there is shown an example of part of the Trier paper (Trier, O. D., Jain, A. K. "Goal-Directed Evaluation of Binarization Methods," *IEEE Trans. on PAMI* Vol. 17 No. 12, December 1995) as seen by a camera. The shiny nature of the pages often causes specularities where the image becomes brighter. As is seen in FIG. 7B, an image is formed by the original grey levels of only the parts of the image with high gradient; elsewhere the image is black. This provides the high-gradient image required. If one looks closely, the grey levels corresponding to the local edge pixels are brighter about the specularity. It is from this image that the local edge values about which to perform contrast enhancement are estimated.

Returning to FIG. 4, the image data (g(x,y)) for the high gradient image undergoes further processing to compute image sums (step S32). This involves computing $$s(x, y) = \sum_{i=0}^{x} \sum_{j=0}^{y} g(i, j).$$

Figure 8B:
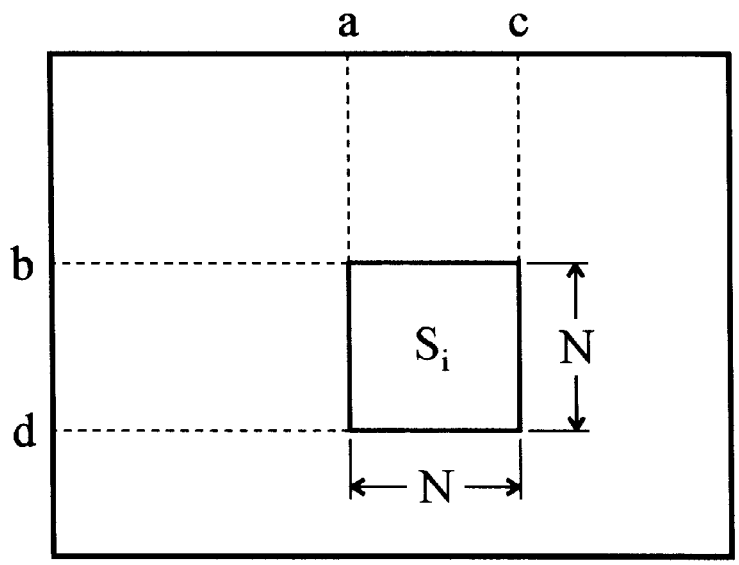
Figure 8C:
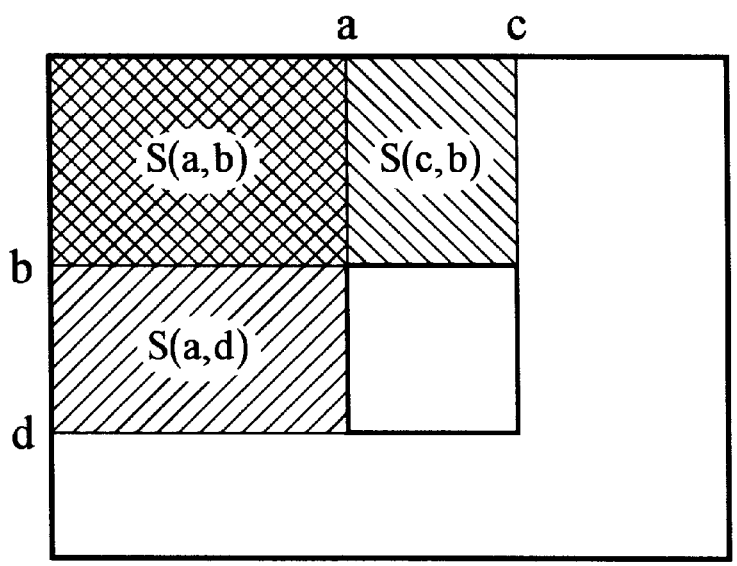

This may be understood by consideration of FIGS. 8A–8C. As shown in FIG. 8A, an image of sums s(x,y) can be constructed from the image of FIG. 7B where s(x,y) is defined to be the sum of all pixels in FIG. 7B in the rectangle to the left and above (x,y). With reference to FIG. 8B, it is necessary to compute the average high-gradient pixel in a region N×N; and as depicted in FIG. 8C, this can be calculated from the image of sums via equation (1) below.

Returning to FIG. 4, the image data (s(x,y)) is next operated on: while looping over all the pixels in the image (steps S33 and S37), the necessary contrast enhancing steps S34–S36 are carried out. For each pixel $f_i$, contrast enhancement must be performed about the grey level $m_i$ corresponding to the local average of the high-gradient pixels (e(m) depends on the local average m(x,y)). This is calculated (step S34) from an image shown in FIG. 7B using the method of partial sums (see (1) Preparata, F. P., Shamos, M. I. "Computational Geometry, An Introduction," Springer-Verlag, 1985, or (2) Omohundro, S. M., "Efficient Algorithms with neural network behaviour," Report No UIUCDS-R-87-133, Dept. Comp. Science, Univ. of Illinois at Urbana-Champaign, April 1987). With reference to FIGS. 8A–8C, the sum of high-gradient pixels $S_i$ in a N by N neighbourhood about $f_i$ is given by:

$$S_i = S(c,d) - S(a,d) - S(c,b) + S(a,b) \quad (1)$$

where s(x,y) is a element of the "sums" image depicted in FIG. 8A. A similar operation can be performed to find the number of high gradient pixels in the neighbourhood $N_i$, involving a sums image N(x,y) which is similarly computed from a binary version of g(x,y). Clearly:

$$m_i = S_i / N_i. \quad (2)$$

Figure 9A:
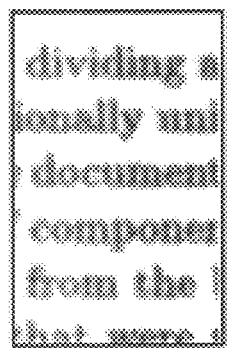
Figure 9B:
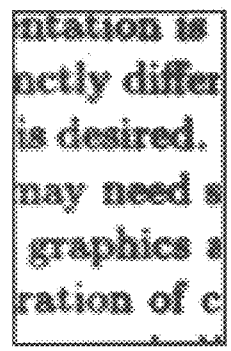
Figure 9C:
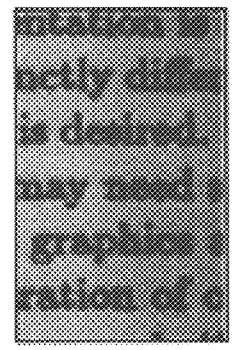

The important point about this is that we can calculate the local average of the high-gradient pixels at any scale (any neighbourhood size) with just four additions (1) and one division (2), once the image of sums has been computed, which is only done once for the whole image. This is a very efficient technique. Thus, the contrast enhancing (clipping) function e(m) can be formed (step S35) for the given pixel of the image. This function is then applied to f(x,y) (the image pixel data resulting from the linear interpolation step) to produce the contrast enhanced image required (step S36). The quality of the enhancement using the locally adaptive contrast enhancement operator e(m,) is shown in FIGS. 9A–9F (corresponding to the original and resultant images under different lighting conditions shown in FIGS. 6A–6F): FIGS. 9A–9C are originals, and FIGS. 9D–9F, respectively, are contrast enhanced results. The size of the neighbourhood has been chosen to be 7×7 at the original resolution. The improvement with respect to the images in FIGS. 6A–6F is quite distinct.

There is one last detail to clarify for the contrast enhancement step. Namely, what happens when there are no high-gradient features in the neighbourhood. In this case, we assume that the lighting gradient in the image is not too severe, and so we use e(128). This is discussed further below.

D. Degradation

The fact that enhancement of the contrast is performed with e(128) when there are no features means in effect that it is assumed that 128 is a good threshold to use when image more than N pixels away from the nearest text feature are sought to be analysed, where N is the size of the local neighbourhood. This is not as bad an assumption as it sounds. Considering that adaptive thresholding is only really critical in the midst of text where high-spatial frequencies are attenuated and white never gets white (the white of the eye of an "e" rarely gets above 128) and black never gets black (the black of a dot of an "i" rarely gets below 128). It is in these situations that bad thresholding can cause OCR errors by merging or missing features.

Figure 10A:
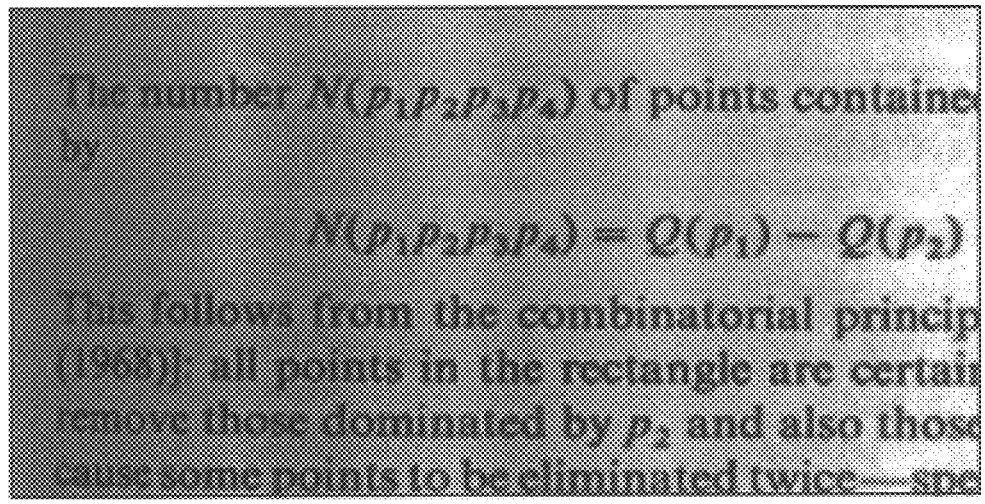
FIGS. 10A–10B show the effects on the operation of the techniques according to the invention under very poor lighting conditions.
Figure 10B:
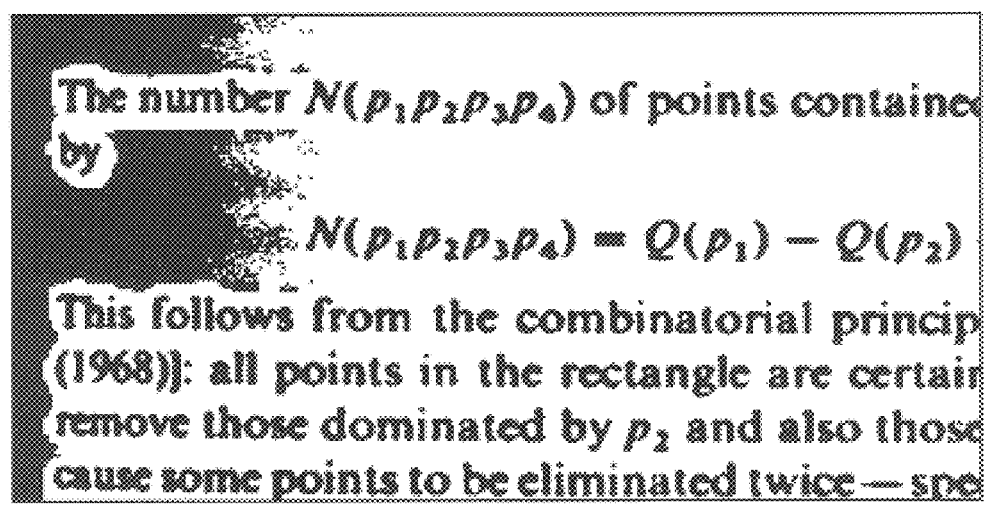

This, therefore, imposes a constraint on the severity of the permissible lighting gradients across the desk. Its failure mode is shown in FIGS. 10A–10B: FIG. 10A is the original image and FIG. 10B is the thresholded image. It can be seen that when the white background falls below 128 then it is miss-classified as black. However, where there is text in these extreme parts of the image, the algorithm is still able to classify correctly. In this sense the algorithm is believed to degrade gracefully. Many OCR algorithms would be able to filter out this artefact at the connected component level.

E. Typical Operation

FIGS. 11A–11B show typical results of the techniques according to the invention under normal lighting condition: FIG. 11A is the original image, and FIG. 11B is the binary image. FIG. 12 shows the results of OCR on the output image of FIG. 11B, using TextBridge® (which is available from Xerox ScanSoft Inc.).

The present invention demonstrates an efficient method for trading greyscale resolution for spatial resolution in order to generate high quality binary images of text/graphics for document camera applications. These binary image can be printed, OCRed, faxed or used as a shared drawing tool backdrop for collaborative document work.

F. Example Image Processing System

Figure 13:
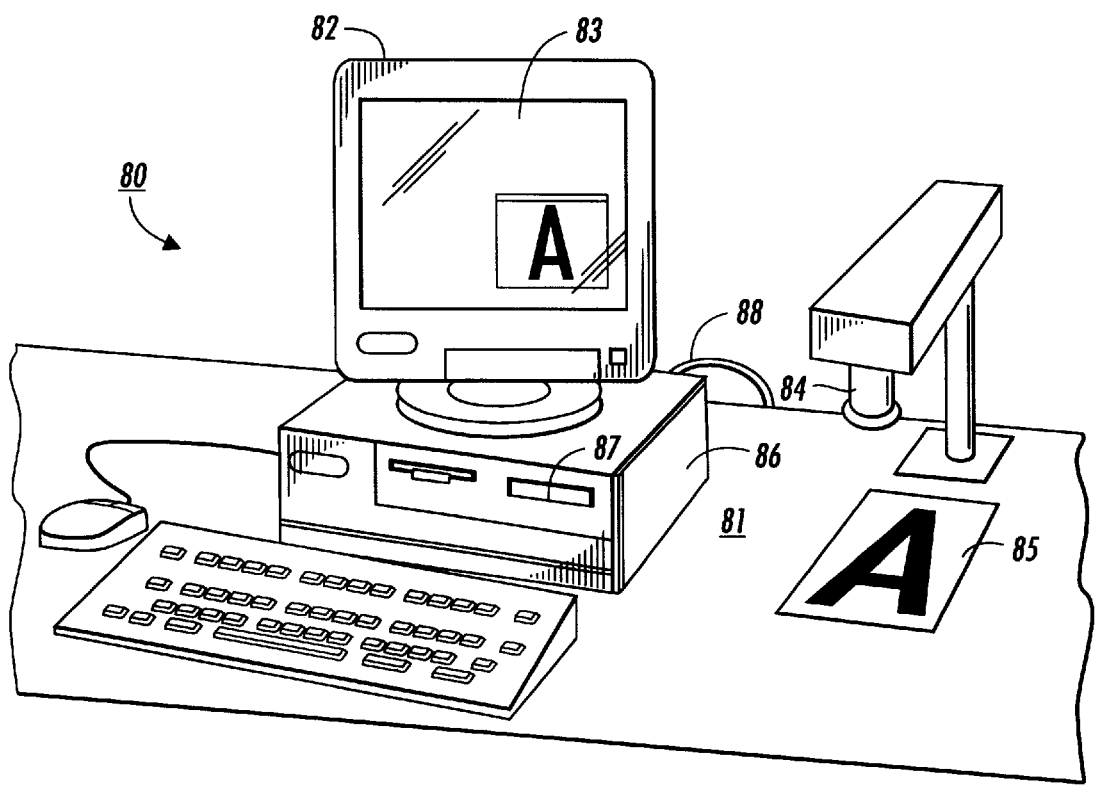
FIG. 13 illustrates an example of an image processing system for carrying out the present invention.

It will be appreciated that the steps of the present invention set forth in the Figures and described herein can be readily implemented by one skilled in the art on an image processing system. FIG. 13 illustrates an example of an image processing system for carrying out the present invention. An interactive desktop system 80 includes a work surface 81, a display device 82 for displaying images in a display area 83, an image capture device 84 for capturing images 85 present on the work surface 81, and a processor 86 and memory 87, coupled to the display device 82 and the image capture device 84 for performing the steps of the present invention. Furthermore, it will be appreciated that the interactive desktop system 80 can communicate with a second interactive desktop system (not shown) over a communications link 88 to define a communications system.

In addition, it will be appreciated by those skilled in the art that the techniques of enhancing and thresholding images according to the present invention can be applied to numerous application areas. These include standalone scanning device that allows the convenient transfer of data from paper to the electronic domain, and that of video-conferencing. Document cameras are already common tools, but they often yield poor quality images as the image coding algorithms are not usually for text images as they are usually designed for low-resolution high frame-rate image transmission. This problem is solved by the present invention.

Furthermore, it will be appreciated that useful types of paper document interface can be realised with the high resolution document cameras enabled with these techniques. On the one hand, these document cameras used as an alternative to fax, especially when the number of pages to be sent is small. On the other hand, it is possible to develop a collaborative tool for video-conferencing. The paper copy is "faxed" to the recipient via the document camera, and all subsequent bandwidth is used for the communication of cursor movements that represent the communicating parties' electronic annotations. In effect, this provides shared drawing application, but instead of the traditional white board background, the users see a fax quality image of the paper document under discussion. Of course, the users can elect to exchange the more usual TV resolution color video where appropriate, for instance where appreciation of motion (talking heads) or 3D shape (a novel design or a broken part) is required.

G. Summary

Described above are various techniques for image enhancement and thresholding of images. It will be appreciated that these techniques may be used in conjunction with the techniques for text/image selection described in U.S. patent application Ser. No. 09/081,266 entitled "Method And Apparatus For Selecting Text And Image Data From Document Images" (Attorney Docket No. R/97007), which is incorporated herein by reference.

It will be appreciated that the present invention may be readily implemented in software using software development environments that provide portable source code that can be used on a variety of hardware platforms. Alternatively, the present invention may be implemented partially or fully in hardware using standard logic circuits. Whether software or hardware is used to implement the present invention varies depending on the speed and efficiency requirements of the particular operating environment and also the particular function and the particular software or hardware systems and the particular microprocessor or microcomputer systems being utilised.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for converting a low resolution greyscale image to a high resolution binary image with an image processing system, comprising the steps of:
    (a) receiving first image data; the first image data being greyscale image data defining an input image;
    (b) performing a high frequency boost operation on the first image data to produce second image data;
    (c) performing a linear interpolation operation on the second image data to produce third image data; the third image data having a resolution higher than the resolution of the second image data;
    (d) performing a contrast enhancement operation on the third image data to produce fourth image data; and
    (e) thresholding the fourth image data to produce fifth image data; the fifth image data being binary image data defining an output image.

2. The method according to claim 1, wherein said step (d) further comprises the steps of:
    (d1) computing high gradient image data (g(x,y)) using the third image data (f(x,y)).

3. The method according to claim 2, wherein said step (d1) comprises applying a Sobel operator to the third image data (f(x,y)) to produce the high gradient image data (g(x,y)).

4. The method according to claim 2, wherein said step (d) further comprises the step of:
    (d2) computing sum image data (s(x,y)) from partial sums of the high gradient image data (g(x,y)).

5. The method according to claim 4, wherein said step (d2) computes the sum image data (s(x,y)) with the following equation:

$$s(x, y) = \sum_{i=0}^{x} \sum_{j=0}^{y} g(i, j).$$

6. The method according to claim 4, wherein said step (d) further comprises performing for each pixel datum of the third image data (f(x,y)) the step of:
    (d3) applying a contrast enhancement function (e(m)) to the third image data; the contrast enhancement function being dependent on a local average (m(x,y)) of pixel data.

7. The method according to claim 6, wherein step (d3) further comprises the steps of:
    (d3i) computing a local average (m(x,y)) of pixel data;
    (d3ii) forming the contrast enhancing function (e(m)) based on the local average; and
    (d3iii) applying the contrast enhancement function (e(m)) to the third image data.

8. The method according to claim 7, wherein said step (d3i) computes the local average $m_i$ for a pixel $f_i$ using the following equation:

$$m_i = S_i/N_i,$$

where
    $S_i$ is the sum of high-gradient image data in an N by N neighbourhood about $f_i$, and
    $N_i$ is the number of high gradient pixels in the N by N neighbourhood about $f_i$.

9. The method according to claim 8, wherein said step (d3i) computes the sum of high gradient pixels $S_i$ in an N by N neighbourhood about $f_i$ using the following equation:

$$S_i = S(c,d) - S(a,d) - S(c,b) + S(a,b),$$

where, S(c,d), S(a,d), S(c,b), and S(a,b) are elements of the sum image data s(x,y).

10. An image processing system for converting a low resolution greyscale image to a high resolution binary image, comprising:
    a memory for storing the low resolution greyscale image, the high resolution binary image, and image processing instructions; and
    a processor coupled to the memory for executing the image processing instructions; the processor in executing the image processing instructions:
        (a) receiving first image data; the first image data being greyscale image data defining an input image;
        (b) performing a high frequency boost operation on the first image data to produce second image data;
        (c) performing a linear interpolation operation on the second image data to produce third image data; the third image data having a resolution higher than the resolution of the second image data;

(d) performing a contrast enhancement operation on the third image data to produce fourth image data; and (e) thresholding the fourth image data to produce fifth image data, the fifth image data being binary image data defining an output image.

11. The image processing system according to claim 10, further comprising an interactive desktop system including:

a work surface;

a display device for displaying images in a display area; and an image capture device for capturing images present on the work surface;

wherein said processor is coupled to said display device and said image capture device for displaying the output image in at least a portion of said display area.

12. The image processing system according to claim 10, further comprising a communications link for transmitting the fifth image data to a second processor.

13. The image processing system according to claim 10, further comprising image processing instructions for (d1) computing high gradient image data (g(x,y)) using the third image data (f(x,y));

(d2) computing sum image data (s(x,y)) from partial sums of the high gradient image data (g(x,y)); and (d3) applying a contrast enhancement function (e(m)) to the third image data; the contrast enhancement function being dependent on a local average (m(x,y)) of pixel data.

14. The image processing system according to claim 13, wherein said instruction (d1) further comprises an instruction for applying a Sobel operator to the third image data (f(x,y)) to produce the high gradient image data (g(x,y)).

15. The image processing system according to claim 13, wherein said instruction (d2) further comprises an instruction for computing the sum image data (s(x,y)) with the following equation:

$$s(x, y) = \sum_{i=0}^{x} \sum_{j=0}^{y} g(i, j).$$

16. The image processing system according to claim 13, wherein said instruction (d) further comprises instructions for:

(d3i) computing a local average (m(x,y)) of pixel data;

(d3ii) forming the contrast enhancing function (e(m)) based on the local average; and (d3iii) applying the contrast enhancement function (e(m)) to the third image data.

17. The image processing system according to claim 16, wherein said instruction (d3i) computes the local average $m_i$ for a pixel $f_i$ using the following equation:

$$m_i = S_i/N_i,$$

where $S_i$ is the sum of high-gradient image data in an N by N neighbourhood about $f_i$, and $N_i$ is the number of high gradient pixels in the N by N neighbourhood about $f_i$.

18. The image processing system according to claim 17, wherein said instruction (d3i) computes the sum of high gradient pixels $S_i$ in an N by N neighbourhood about $f_i$ using the following equation:

$$S_i = S(c,d) - S(a,d) - S(c,b) + S(a,b),$$

where, S(c,d), S(a,d), S(c,b), and S(a,b) are elements of the sum image data s(x,y).

* * * * *